(12) United States Patent
Nakatsu

(10) Patent No.: US 9,233,689 B2
(45) Date of Patent: *Jan. 12, 2016

(54) VEHICLE BRAKING/DRIVING FORCE CONTROL APPARATUS

(71) Applicant: TOYOTA JIDOSHA KABUSHIKI KAISHA, Toyota-shi, Aichi (JP)

(72) Inventor: Masatoshi Nakatsu, Susono (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/514,940

(22) Filed: Oct. 15, 2014

(65) Prior Publication Data

US 2015/0105978 A1    Apr. 16, 2015

(30) Foreign Application Priority Data

Oct. 16, 2013 (JP) ................................. 2013-215341

(51) Int. Cl.
*B60W 30/04* (2006.01)
*B60W 10/192* (2012.01)
*B60W 20/00* (2006.01)
(Continued)

(52) U.S. Cl.
CPC .............. *B60W 30/04* (2013.01); *B60W 10/08* (2013.01); *B60W 10/192* (2013.01); *B60W 10/22* (2013.01); *B60W 2030/043* (2013.01)

(58) Field of Classification Search
CPC ..... B60W 10/00; B60W 10/04; B60W 10/08; B60W 10/12; B60W 10/18; B60W 30/00; B60W 30/02; B60W 30/04

USPC .................... 701/22, 37–40, 69–95
See application file for complete search history.

(56) References Cited

U.S. PATENT DOCUMENTS 5,822,709 A * 10/1998 Fujita .............................. 701/70
2003/0192375 A1 * 10/2003 Sugai et al. ..................... 73/146
(Continued)

FOREIGN PATENT DOCUMENTS

JP    2007124735 A    5/2007
JP    2007-161032 A    6/2007
(Continued)

OTHER PUBLICATIONS

Communication dated Apr. 21, 2015 from the U.S. Patent and Trademark Office in counterpart U.S. Appl. No. 14/514,734.
(Continued)

*Primary Examiner* — Thomas Tarcza
*Assistant Examiner* — Tyler J Lee
(74) *Attorney, Agent, or Firm* — Sughrue Mion, PLLC

(57) ABSTRACT

When an ECU carries out vehicle yaw motion control on such a vehicle that a conversion rate of converting the braking/driving force into a vertical force is larger on rear wheels than on front wheels, a driver-requested braking/driving force is distributed to the four wheels so that a distribution ratio is larger for the rear wheels than for the front wheels. Thus, when roll control necessary as a result of the vehicle yaw motion control is carried out, a target braking/driving force of a turning outer wheel for which the largest control driving force is required becomes hard to reach a driving limit. From the foregoing, when vehicle motion control is carried out with use of a braking/driving force of each wheel, each wheel is prevented from reaching a driving force limit as much as possible.

9 Claims, 7 Drawing Sheets

(51) Int. Cl.
  *B60W 10/08* (2006.01)
  *B60W 10/22* (2006.01)

(56) References Cited

U.S. PATENT DOCUMENTS

| | | | |
|---|---|---|---|
| 2005/0090943 A1* | 4/2005 | Kogure et al. | 701/1 |
| 2009/0319114 A1* | 12/2009 | Takenaka et al. | 701/29 |
| 2010/0168975 A1* | 7/2010 | Takahara et al. | 701/70 |
| 2011/0015844 A1* | 1/2011 | Perkins et al. | 701/69 |
| 2015/0088379 A1* | 3/2015 | Hirao | 701/37 |

FOREIGN PATENT DOCUMENTS

| | | |
|---|---|---|
| JP | 2008-12972 A | 1/2008 |
| JP | 2009-113772 A | 5/2009 |
| JP | 2009-143310 A | 7/2009 |
| JP | 2009247205 A | 10/2009 |
| JP | 2009-273274 A | 11/2009 |

OTHER PUBLICATIONS

Communication dated Aug. 12, 2015 from the United States Patent and Trademark Office in counterpart U.S. Appl. No. 14/514,734.

* cited by examiner

Fx=Fdx+Fcx

VEHICLE BRAKING/DRIVING FORCE CONTROL APPARATUS

BACKGROUND OF THE INVENTION

1. Field of the Invention

The present invention relates to a vehicle braking/driving force control apparatus for independently controlling a driving force and a braking force of each of four (front left and right and rear left and right) wheels of a vehicle.

2. Description of the Related Art

Hitherto, there has been known a vehicle braking/driving force control apparatus for independently controlling a driving force and a braking force (both are collectively referred to as braking/driving force) for four wheels of a vehicle. For example, in a vehicle of an in-wheel motor type as a form of an electric vehicle, a motor is arranged inside or closely to the wheel of the vehicle, and the wheel is directly driven by the motor. The motors provided for the respective wheels can be independently controlled for driving. In the vehicle of the in-wheel motor type, each motor is individually controlled for power running or regeneration, and a driving torque or a braking torque applied to each wheel is thus individually controlled, thereby controlling a vehicle travel and a vehicle motion.

For example, in a vehicle travel control apparatus disclosed in Japanese Patent Application Laid-open No. 2009-143310, a yaw motion during turning of a vehicle is controlled, and a driving force of each of in-wheel motors is controlled so as to suppress a roll behavior generated in response to a suspension characteristic of the vehicle as a result of the control for the yaw motion.

SUMMARY OF THE INVENTION

However, when the braking/driving force on the wheel is controlled to control the vehicle motion, there arises such a problem that the braking/driving force is biased to the front wheel side or the rear wheel side, and a certain wheel reaches an output limit earlier than the other wheels. A description is now given of this problem.

Each wheel is coupled via a suspension link mechanism to a vehicle body. In general, as illustrated in FIG. 3, an instantaneous rotation center Cf of a suspension link mechanism for coupling a front wheel 10f to a vehicle body B is positioned behind and above the front wheel 10f, and an instantaneous rotation center Cr of a suspension link mechanism for coupling a rear wheel 10r to the vehicle body B is positioned ahead of and above the rear wheel 10r. Therefore, when a driving torque is applied to the front wheel 10f, a force Ff1 forward in a travel direction of the vehicle acts at a ground contact point of the front wheel 10f, and a vertical force Fzf1 (a component force downward in the vertical direction acting on the suspension link mechanism) biasing the vehicle body B downward via the suspension link mechanism is generated by the force Ff1 at the ground contact point of the front wheel 10f. Thus, the force in the direction of sinking the vehicle body B acts as a result of the driving of the front wheel 10f. In contrast, when a braking torque is applied to the front wheel 10f, a force Ff2 backward in the travel direction of the vehicle acts at the ground contact point of the front wheel 10f, and a vertical force Fzf2 (a component force upward in the vertical direction acting on the suspension link mechanism) biasing the vehicle body B upward via the suspension link mechanism is generated by the force Ff2 at the ground contact point of the front wheel 10f. Thus, the force in the direction of raising the vehicle body B acts as a result of the braking of the front wheel 10f.

On the other hand, the generation direction of the vertical force on the rear wheel 10r is opposite to that for the front wheel 10f. In other words, when a driving torque is applied to the rear wheel 10r, a force Fr1 forward in the travel direction of the vehicle acts at a ground contact point of the rear wheel 10r, and a vertical force Fzr1 (a component force upward in the vertical direction acting on the suspension link mechanism) biasing the vehicle body B upward via the suspension link mechanism is generated by the force Fr1 at the ground contact point of the rear wheel 10r. Thus, the force in the direction of raising the vehicle body B acts as a result of the driving of the rear wheel 10r. In contrast, when a braking torque is applied to the rear wheel 10f, a force Fr2 backward in the travel direction of the vehicle acts at the ground contact point of the rear wheel 10r, and a vertical force Fzr2 (a component force downward in the vertical direction acting on the suspension link mechanism) biasing the vehicle body B downward via the suspension link mechanism is generated by the force Fr2 at the ground contact point of the rear wheel 10r. Thus, the force in the direction of sinking the vehicle body B acts as a result of the braking of the rear wheel 10r.

When an angle formed by a ground horizontal surface and a line connecting between the ground contact point of the front wheel 10f and the instantaneous rotation center Cf is denoted by $\theta f$, and an angle formed by the ground horizontal surface and a line connecting between the ground contact point of the rear wheel 10r and the instantaneous rotation center Cr is denoted by $\theta r$, a magnitude of the vertical force is a value acquired by multiplying the braking/driving force Ff (Ff1 or Ff2) by $\tan(\theta f)$ for the front wheel 10f side, and a magnitude of the vertical force is a value acquired by multiplying the braking/driving force Fr (Fr1 or Fr2) by $\tan(\theta r)$ for the rear wheel 10r side. These terms of $\tan(\theta f)$ and $\tan(\theta r)$ represent conversion rates for converting the braking/driving forces into the vertical forces on the vehicle body B. The angle $\theta r$ is larger than the angle $\theta f$ ($\theta f < \theta r$) due to the structure of the suspension link mechanism in an ordinary vehicle. Thus, the suspension link mechanism for the front wheel 10f is smaller in the conversion rate than the suspension link mechanism for the rear wheel 10r. Therefore, the front wheel 10f side and the rear wheel 10r side are the same in a control range for the braking/driving force, but the front wheel 10f side is smaller than the rear wheel 10r side in a control range for the vertical force. In other words, the range of the vertical force which can be generated by controlling the braking/driving force for the front wheel 10f is narrower than the range of the vertical force which can be generated by controlling the braking/driving force for the rear wheel 10r.

Therefore, when the driver-requested braking/driving force in response to the operation amount by the driver is secured, and the vertical forces are generated for the motion control for the vehicle, the braking/driving force of the front wheel 10f first tends to exceed a control range (upper limit) of the in-wheel motor. As a result, the control range for the vehicle motion control narrows.

This also holds true for such a vehicle that the suspension link mechanism for the rear wheel 10r is smaller in the conversion rate for converting the braking/driving force into the vertical force than the suspension link mechanism for the front wheel 10f, and the braking/driving force of the rear wheel 10r first tends to exceed the in-wheel motor control range (upper limit) in this case.

The present invention has been made in view of the above-mentioned problem, and therefore has an object to prevent each of wheels from reaching the driving force limit as much as possible when the braking/driving force of each of the wheels is used to carry out the vehicle motion control.

In order to achieve the above-mentioned object, one feature of one embodiment of the present invention resides in a vehicle braking/driving force control apparatus, including: an actuator (30) for independently driving a front left wheel, a front right wheel, a rear left wheel, and a rear right wheel, thereby generating a braking/driving force representing both a braking force and a driving force on each of the front left wheel, the front right wheel, the rear left wheel, and the rear right wheel; a suspension link mechanism (20) for independently coupling the each of the front left wheel, the front right wheel, the rear left wheel, and the rear right wheel to a vehicle body, and converting the braking/driving force on the each of the front left wheel, the front right wheel, the rear left wheel, and the rear right wheel driven by the actuator into a force in a vertical direction of the vehicle body, the suspension link mechanism being configured so that a conversion rate of converting the braking/driving force into the force in the vertical direction of the vehicle body is different between a front wheel side and a rear wheel side; target braking/driving force calculation means (50, S17) for calculating target braking/driving forces for the four wheels, including a driver-requested braking/driving force set based on an operation amount of a driver and a motion control braking/driving force necessary for vehicle motion control; actuator control means (50, 35, S18) for controlling operations of the actuators by following the target braking/driving forces; and distribution setting means (50, S15) for setting a distribution of the driver-requested braking/driving force to the front wheels and the rear wheels so that the distributed driver-requested braking/driving force is larger for the wheels coupled to the suspension link mechanisms having a larger conversion rate than for the wheels coupled to the suspension link mechanisms having a smaller conversion rate.

According to the present invention, the front left, front right, rear left, and rear right wheels are coupled to the vehicle body via the suspension link mechanisms independently provided for the respective wheels. The actuator applies the driving force and the braking force to each wheel. For example, an in-wheel motor built into the wheel is used as the actuator. The braking/driving force of the wheel driven by the actuator is converted by the suspension link mechanism into the force in the vertical direction of the vehicle body. Vehicle motions can be controlled by controlling the vertical forces. For example, a roll state, a pitch state, and a heave state of the vehicle can be controlled. The target braking/driving force calculation means calculates the target braking/driving forces for the four wheels, including the driver-requested braking/driving force set based on the operation amount of the driver, such as an accelerator operation amount and a brake operation amount, and the motion control braking/driving force necessary for the vehicle motion control. The actuator control means controls the operations of the actuators by following the target braking/driving forces.

The suspension link mechanisms are configured so that the conversion rate of converting the braking/driving force into the force in the vertical direction of the vehicle body is different between the front wheel side and the rear wheel side. For example, the conversion rate is a value corresponding to a magnitude of an angle formed by a ground horizontal surface and a line connecting between a ground contact point of the wheel and an instantaneous rotation center of the suspension link mechanism for coupling the wheel in a side view of the vehicle. This configuration prevents the angle formed by the ground horizontal surface and the line connecting between the ground contact point of the front wheel and the instantaneous rotation center of the suspension link mechanism and the angle formed by the ground horizontal surface and the line connecting between the ground contact point of the rear wheel and the instantaneous rotation center of the suspension link mechanism from being equal to each other. Therefore, the range of the vertical force which can be generated by the control for the braking/driving forces on the wheels is different between the front wheel and the rear wheel, and the range is narrower for the wheel coupled to the suspension link mechanism having the smaller conversion rate. As a result, the driver-requested braking/driving force is secured, and when the vertical forces are generated for the vehicle motion control, the braking/driving force of the wheel coupled to the suspension link mechanism having a smaller conversion rate tends to first exceeds a control range (a driving limit of the actuator or a driving limit determined by a road surface friction).

Thus, according to one embodiment of the present invention, the distribution setting means sets the distribution of the driver-requested braking/driving force to the front wheels and the rear wheels so that the distributed driver-requested braking/driving force is larger for the wheels coupled to the suspension link mechanisms having the larger conversion rate than for the wheels coupled to the suspension link mechanisms having the smaller conversion rate. As a result, on the wheel coupled to the suspension link mechanism having the smaller conversion rate, the driver-requested braking/driving force is satisfied, and a wide effective braking/driving force range available for the vehicle motion control can be secured so that the braking/driving force is hard to reach the driving force limit.

Another feature of one embodiment of the present invention resides in that the vehicle braking/driving force control apparatus further includes distribution switching means (50, S13, S14, S15) for switching the distribution of the driver-requested braking/driving force to the front wheels and the rear wheels so that a distribution ratio of the driver-requested braking/driving force to the wheels coupled to the suspension link mechanisms having the larger conversion rate becomes larger when the vehicle motion control is carried out than when the vehicle motion control is not carried out, and that when at least the vehicle motion control is carried out, the distribution setting means sets the distribution of the driver-requested braking/driving force to the front wheels and the rear wheels so that the distributed driver-requested braking/driving force is larger for the wheels coupled to the suspension link mechanisms having the larger conversion rate than for the wheels coupled to the suspension link mechanisms having the smaller conversion rate (S15).

According to one embodiment of the present invention, the distribution switching means switches the distribution of the driver-requested braking/driving force to the front wheels and the rear wheels so that the distribution ratio of the driver-requested braking/driving force to the wheels coupled to the suspension link mechanisms having the larger conversion rate becomes larger when the vehicle motion control is carried out than when the vehicle motion control is not carried out. Then, when at least the vehicle motion control is carried out, the distribution setting means sets the distribution of the driver-requested braking/driving force to the front wheels and the rear wheels so that the distributed driver-requested braking/driving force is larger for the wheels coupled to the suspension link mechanisms having the larger conversion rate than for the wheels coupled to the suspension link mechanisms having the smaller conversion rate. As a result, when the vehicle motion control is carried out, on the wheel coupled to the suspension link mechanism having a small conversion rate, a wide effective driving force range available for the vehicle motion control can be secured, and the braking/driving force becomes hard to reach the driving force limit.

Another feature of one embodiment of the present invention resides in that the vehicle braking/driving force control apparatus further includes non-motion-control-time distribution setting means (S14) for setting, when the vehicle motion control is not carried out, the distributions of the driver-requested braking/driving force to the front left wheel, the front right wheel, the rear left wheel, and the rear right wheel to be equal to one another.

According to one embodiment of the present invention, when the vehicle motion control is not carried out, the tire generation forces are equalized, and vehicle stability can thus be increased.

Another feature of one embodiment of the present invention resides in that the distribution switching means switches the distribution of the driver-requested braking/driving force to the front wheels and the rear wheels so that the distribution ratio of the driver-requested braking/driving force to the wheels coupled to the suspension link mechanisms having the larger conversion rate becomes larger when vehicle yaw motion control is carried out than when the vehicle yaw motion control is not carried out, and that when at least the vehicle yaw motion control is carried out, the distribution setting means sets the distribution of the driver-requested braking/driving force to the front wheels and the rear wheels so that the distributed driver-requested braking/driving force is larger for the wheels coupled to the suspension link mechanisms having the larger conversion rate than for the wheels coupled to the suspension link mechanisms having the smaller conversion rate.

When the vehicle yaw motion control is carried out, reversed-phase braking/driving forces (a driving force on a turning outer wheel and a braking force on a turning inner wheel) are set on the left and right wheels as the motion control braking/driving forces. As a result, the vertical force acting on the vehicle body via the suspension link mechanism for the front left wheel and the vertical force acting on the vehicle body via the suspension link mechanism for the front right wheel are opposite to each other in direction, resulting in a roll moment on the vehicle body on the front wheel side. Moreover, the vertical force acting on the vehicle body via the suspension link mechanism for the rear left wheel and the vertical force acting on the vehicle body via the suspension link mechanism for the rear right wheel are opposite to each other in direction, resulting in a roll moment on the vehicle body on the rear wheel side. In this case, the front wheel side and the rear wheel side are opposite to each other in the direction of the roll moment, but the magnitude of the roll moment is larger on the wheel side coupled to the suspension link mechanisms having a larger conversion rate of the vertical force. In order to suppress the roll of the vehicle body generated by the yaw motion control, roll control needs to be carried out so that the roll moment generated on the front wheel side and the roll moment generated on the rear wheel side are balanced with each other. The braking/driving force of the wheel coupled to the suspension link mechanism having the smaller conversion rate needs to be larger than the braking/driving force on the wheel coupled to the suspension link mechanism having the larger conversion rate in order to suppress the roll of the vehicle body. However, as a result of the increase, the motion control braking/driving force necessary for the turning outer wheel coupled to the suspension link mechanism having the smaller conversion rate is increased.

Also in this case, according to one embodiment of the present invention, the distribution of the driver-requested braking/driving force to the front wheels and the rear wheels is switched so that the distribution ratio of the driver-requested braking/driving force to the wheels coupled to the suspension link mechanisms having the larger conversion rate becomes larger when vehicle yaw motion control is carried out than when the vehicle yaw motion control is not carried out. Then, when at least the vehicle yaw motion control is carried out, the distribution setting means sets the distribution of the driver-requested braking/driving force to the front wheels and the rear wheels so that the distributed driver-requested braking/driving force is larger for the wheels coupled to the suspension link mechanisms having the larger conversion rate than for the wheels coupled to the suspension link mechanisms having the smaller conversion rate. Thus, a margin for applying the motion control braking/driving force for the yaw motion control and the roll control is secured for the wheel coupled to the suspension link mechanism having the smaller conversion rate. As a result, the turning outer wheel coupled to the link mechanism having the smaller conversion rate becomes hard to reach the driving limit, and the roll control can be excellently carried out during the yaw motion control. Moreover, when the yaw motion control is not carried out, the distributions of the driver-requested braking/driving force to the front left, front right, rear left, and rear right wheels can be equalized, and tire generation forces can thus be equalized, resulting in an increase in vehicle stability.

Another feature of one embodiment of the present invention resides in that when vehicle yaw motion control is carried out, the target braking/driving force calculation means calculates the motion control braking/driving force for the each of the front left wheel, the front right wheel, the rear left wheel, and the rear right wheel so that a front wheel roll moment generated by the driving forces of the front wheels and a rear wheel roll moment generated by the driving forces of the rear wheels are balanced with each other during the vehicle yaw motion control (S16).

When vehicle yaw motion control is carried out on a vehicle including suspension link mechanisms having different conversion rates of vertical forces between the front wheel side and the rear wheel side, the front wheel roll moment generated by the driving forces of the front wheels and the rear wheel roll moment generated by the driving forces of the rear wheels are opposite in direction, but are not the same in magnitude. Thus, the target braking/driving force calculation means calculates the motion control braking/driving forces for the respective wheels so as to balance the front wheel roll moment and the rear wheel roll moment with each other. In this case, the distribution of the driver-requested braking/driving force to the front wheels and the rear wheels is set so that the distributed driver-requested braking/driving force is larger for the wheels coupled to the suspension link mechanisms having the larger conversion rate of the vertical force than the wheels coupled to the suspension link mechanisms having the smaller conversion rate of the vertical force. As a result, the roll of the vehicle body can be excellently suppressed.

Another feature of one embodiment of the present invention resides in that the vehicle braking/driving force control apparatus further includes reserve force equalization means (S15) for setting a distribution ratio of the driver-requested braking/driving force between the front wheels and the rear wheels so that reserve vertical forces, which are able to be generated via the suspension link mechanisms on the vehicle body by the braking/driving forces on the front left wheel, the front right wheel, the rear left wheel, and the rear right wheel, are equal between the front wheel side and the rear wheel side.

According to one embodiment of the present invention, the reserve force equalization means sets the distribution ratio of the driver-requested braking/driving force between the front and rear wheels so that the reserve vertical forces, which are able to be generated via the suspension link mechanisms on the vehicle body by the braking/driving forces on the wheels, are equal between the front wheel side and the rear wheel side. Therefore, when the vehicle motion control is carried out, the distribution of the braking/driving force to the front and rear wheels can be balanced more. As a result, the braking/driving force on a certain wheel is prevented from early reaching the limit.

Another feature of one embodiment of the present invention resides in that the vehicle braking/driving force control apparatus further includes small-requested-braking/driving-force distribution ratio setting means (S15) for setting, when the driver-requested braking/driving force is less than a set value set in advance, the distribution ratio between the front wheels and the rear wheels so that the driver-requested braking/driving force is distributed only to the wheels coupled to the suspension link mechanisms having the larger conversion rate.

The reserve vertical forces, which can be generated on the vehicle body by the braking/driving forces on the wheels via the suspension link mechanisms, cannot be equalized between the front wheel side and the rear wheel side when the driver-requested braking/driving force becomes smaller than a certain value. Thus, according to one embodiment of the present invention, the small-requested-braking/driving-force distribution ratio setting means distributes, when the driver-requested braking/driving force is less than a set value set in advance, the driver-requested braking/driving force is distributed only to the wheels coupled to the suspension link mechanisms having the larger conversion rate. In other words, the driver-requested braking/driving force is not distributed to the wheels coupled to the suspension link mechanisms having the smaller conversion rate. As a result, when the driver-requested braking/driving force is small, the driver-requested braking/driving force can be appropriately distributed to the front and rear wheels.

Another feature of one embodiment of the present invention resides in that the vehicle braking/driving force control apparatus further includes state-amount-adapted distribution ratio setting means (S15) for detecting a motion state amount of a vehicle, and setting a distribution ratio of the driver-requested braking/driving force between the front wheels and the rear wheels depending on the motion state amount. In this case, the state-amount-adapted distribution ratio setting means may set the distribution ratio of the driver-requested braking/driving force to the rear wheel side so as to increase as the motion state amount increases.

According to one embodiment of the present invention, the distribution ratio of the driver-requested braking/driving force between the front and rear wheels can be appropriately set depending on the motion state amount, and hence the braking/driving force on a certain wheel can be prevented from early reaching the limit.

In the description above, reference symbols used in the embodiment are enclosed in parentheses and assigned to each configuration of the invention corresponding to the embodiment in order to facilitate the understanding of the invention, but each configuration requirement of the invention is not limited to the embodiment prescribed by the reference symbols.

DETAILED DESCRIPTION OF THE PREFERRED EMBODIMENT

Figure 1:
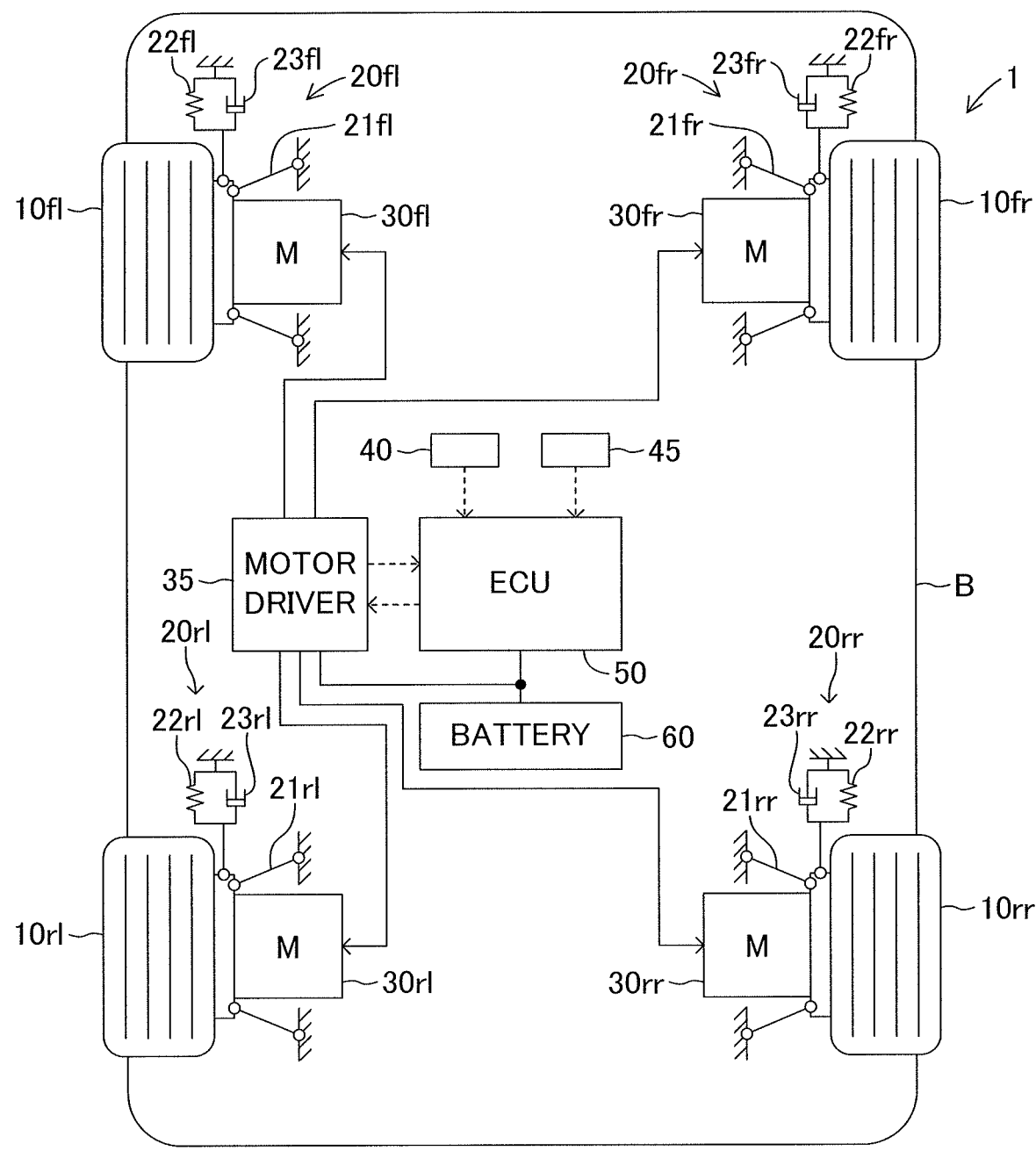
FIG. 1 is a schematic configuration diagram of a vehicle on which a vehicle braking/driving force control apparatus according to an embodiment of the present invention is installed.

A detailed description is now given of an embodiment of the present invention referring to the drawings. FIG. 1 schematically illustrates a configuration of a vehicle 1 on which a vehicle braking/driving force control apparatus according to this embodiment is mounted.

The vehicle 1 includes a front left wheel 10$fl$, a front right wheel 10$fr$, a rear left wheel 10$rl$, and a rear right wheel 10$rr$. The front left wheel 10$fl$, the front right wheel 10$fr$, the rear left wheel 10$rl$, and the rear right wheel 10$rr$ are suspended via independent suspensions 20$fl$, 20$fr$, 20$rl$, and 20$rr$ to a vehicle body B.

The suspensions 20$fl$, 20$fr$, 20$rl$, and 20$rr$ are coupling structures for coupling the vehicle body B and the wheels 10$fl$, 10$fr$, 10$rl$, and 10$rr$ to each other, respectively, and include link mechanisms 21$fl$, 21$fr$, 21$rl$, and 21$rr$ constructed by suspension arms and the like, suspension springs 22$fl$, 22$fr$, 22$rl$, and 22$rr$ for supporting loads in the vertical direction and absorbing impact, and shock absorbers 23$fl$, 23$fr$, 23$rl$, and 23$rr$ for attenuating a vibration of a sprung mass (vehicle body B). The suspension link mechanisms according to the present invention are elements for determining instantaneous rotation centers, which are entire elements for determining motions of unsprung masses, and do not mean only the link mechanisms 21$fl$, 21$fr$, 21$rl$, and 21$rr$, but represent the entire suspensions 20$fl$, 20$fr$, 20$rl$, and 20$rr$ including the suspension springs 22$fl$, 22$fr$, 22$rl$, and 22$rr$ and the shock absorbers 23$fl$, 23$fr$, 23$rl$, and 23$rr$ in addition to the link mechanisms 21$fl$, 21$fr$, 21$rl$, and 21$rr$. A publicly known four-wheel independent suspension such as a strut type suspension and a wishbone type suspension can be employed as the suspensions 20$fl$, 20$fr$, 20$rl$, and 20$rr$.

Motors 30$fl$, 30$fr$, 30$rl$, and 30$rr$ are built into the inside of the front left wheel 10$fl$, the front right wheel 10$fr$, the rear left wheel 10$rl$, and the rear right wheel 10$rr$. The motors 30$fl$, 30$fr$, 30$rl$, and 30$rr$, which are so-called in-wheel motors, are respectively arranged at unsprung locations of the vehicle 1 along with the front left wheel 10$fl$, the front right wheel 10$fr$, the rear left wheel 10$rl$, and the rear right wheel 10$rr$, and are coupled to the front left wheel 10*fl*, the front right wheel 10*fr*, the rear left wheel 10*rl*, and the rear right wheel 10*rr* for power transmission. In the vehicle 1, rotations of the respective motors 30*fl*, 30*fr*, 30*rl*, and 30*rr* can be independently controlled to independently control the driving forces and the braking forces to be generated on the front left wheel 10*fl*, the front right wheel 10*fr*, the rear left wheel 10*rl*, and the rear right wheel 10*rr*.

In the following, the respective wheels 10*fl*, 10*fr*, 10*rl*, and 10*rr*, the suspensions 20*fl*, 20*fr*, 20*rl*, and 20*rr*, the link mechanisms 21*fl*, 21*fr*, 21*rl*, and 21*rr*, the suspension springs 22*fl*, 22*fr*, 22*rl*, and 22*rr*, the shock absorbers 23*fl*, 23*fr*, 23*rl*, and 23*rr*, and the motors 30*fl*, 30*fr*, 30*rl*, and 30*rr* are generally referred to as wheel 10, suspension 20, link mechanism 21, suspension spring 22, shock absorber 23, and motor 30 unless a specific one needs to be identified. Moreover, if the front wheels 10*fl* and 10*fr* and the rear wheels 10*rl* and 10*rr* need to be distinguished from each other and identified among the wheels 10*fl*, 10*fr*, 10*rl*, and 10*rr*, the front wheels 10*fl* and 10*fr* are referred to as front wheel 10*f*, and the rear wheels 10*rl* and 10*rr* are referred to as rear wheel 10*r*. Similarly, for the suspension 20, the link mechanism 21, the suspension spring 22, the shock absorber 23, and the motor 30, if ones on the front wheel side are identified, they are referred to as front wheel suspension 20*f*, front wheel link mechanism 21*f*, front wheel suspension spring 22*f*, front wheel shock absorber 23*f*, and front wheel motor 30*f*, and if ones on the rear wheel side are identified, they are referred to as rear wheel suspension 20*r*, rear wheel link mechanism 21*r*, rear wheel suspension spring 22*r*, rear wheel shock absorber 23*r*, and rear wheel motor 30*r*.

For example, brushless motors are used as the respective motors 30. The respective motors 30 are connected to a motor driver 35. The motor driver 35 includes, for example, inverters, and four sets of inverters are provided for the respective motors 30. The motor driver 35 converts DC power supplied from a battery 60 into AC power, and independently supplies the AC power to the respective motors 30. As a result, the driving of the respective motors 30 is controlled to generate torques to apply the driving forces to the respective wheels 10. Such a state that the electric power is supplied to the motor 30 to generate the driving torque is referred to as power running.

Moreover, each motor 30 also functions as an electric power generator, for generating electric power from rotational energy of each wheel 10, and recharging the battery 60 with the generated electric power via the motor driver 35. The braking torque generated by the electric power generation of the motor 30 applies the braking force to the wheel 10. A brake apparatus is provided for each wheel 10, but does not directly relate to the present invention, and a description and illustration thereof are therefore omitted.

The motor driver 35 is connected to an electronic control unit 50. The electronic control unit 50 (hereinafter referred to as ECU 50) includes a microcomputer constructed by a CPU, a ROM, and a RAM as a main component, and executes various programs to independently control the operations of the individual motors 30. The ECU 50 is connected to an operation state detection device 40 for detecting an operation state of operations performed by the driver to control the vehicle to travel, and a motion state detection device 45 for detecting a motion state of the vehicle, and inputs detection signals output from the detection devices 40 and 45.

The operation state detection device 40 is constructed by an accelerator sensor for detecting an accelerator operation amount by the driver based on a depressing amount (or an angle or a pressure) of an accelerator pedal, a brake sensor for detecting a brake operation amount by the driver based on a depressing amount (or an angle or a pressure) of a brake pedal, a steering angle sensor for detecting a steering operation amount of an operation on a steering wheel by the driver, and the like. The motion state detection device 45 is constructed by an appropriate combination of a vehicle speed sensor for detecting a travel speed of a vehicle body B, a yaw rate sensor for detecting a yaw rate of the vehicle body B, a sprung mass acceleration sensor for detecting an acceleration in the vertical direction of the vehicle body B (sprung mass) at each wheel position, a lateral acceleration sensor for detecting a lateral acceleration in the lateral direction of the vehicle body B, a pitch rate sensor for detecting a pitch rate of the vehicle body B, a roll rate sensor for detecting a roll rate of the vehicle body B, a stroke sensor for detecting a stroke amount of each suspension 20, an unsprung mass acceleration sensor for detecting a vertical acceleration in the vertical direction of an unsprung mass of the each wheel 10, and the like. A direction of a sensor value including a direction element is identified depending on the sign thereof.

Figure 3:
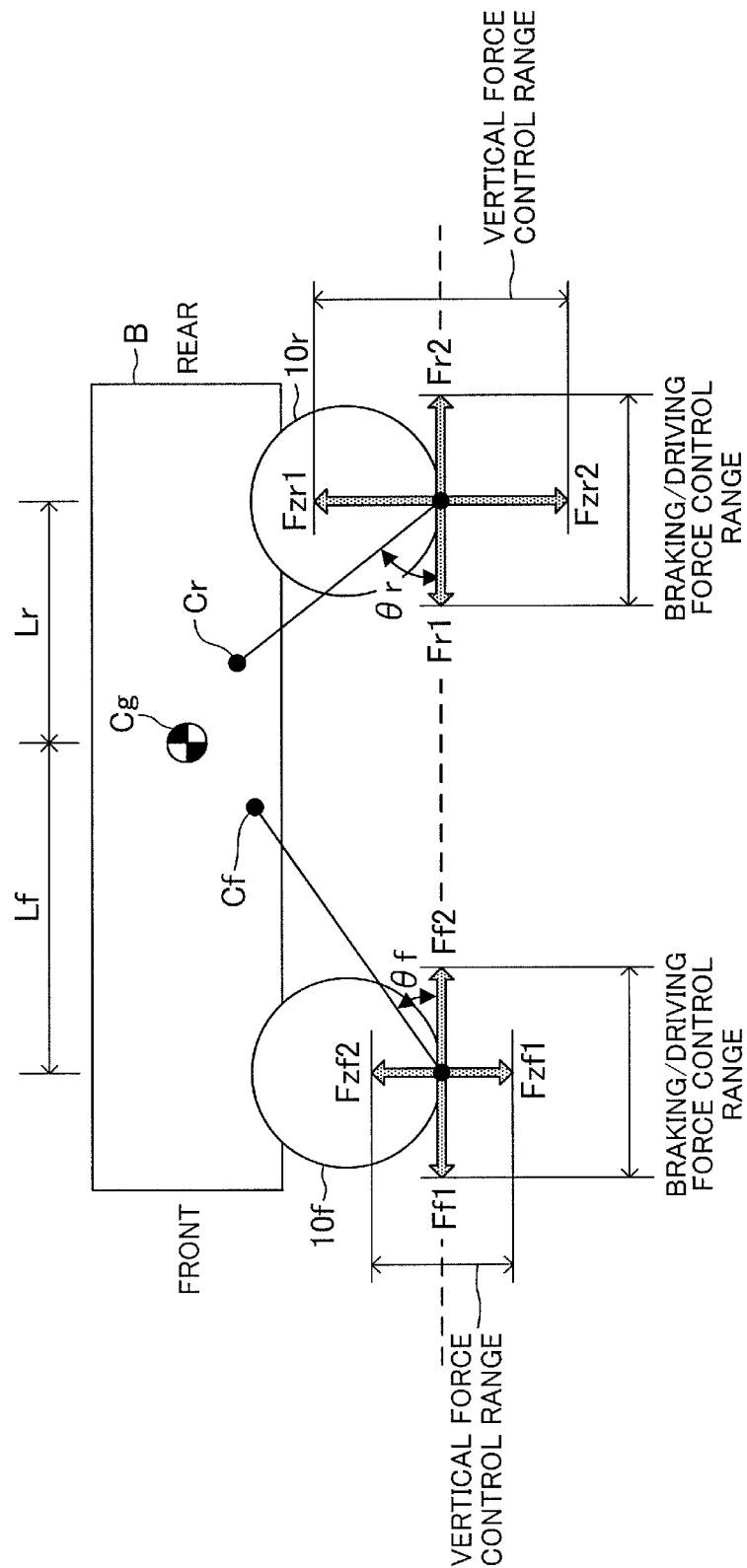
FIG. 3 is a diagram illustrating a relationship between control ranges of braking/driving forces and control ranges of vertical forces.

As illustrated in FIG. 3, the suspension 20 for suspending each wheel 10 is configured so that, in side view of the vehicle, an instantaneous rotation center Cf (an instantaneous center of the front wheel 10*f* with respect to the vehicle body B) of the front wheel suspension 20*f* is positioned behind and above the front wheel 10*f*, and an instantaneous rotation center Cr (an instantaneous center of the rear wheel 10*r* with respect to the vehicle body B) of the rear wheel suspension 20*r* is positioned ahead of and above the rear wheel 10*r*. Moreover, when an angle (smaller angle) formed by a ground horizontal surface and a line connecting between a ground contact point of the front wheel 10*f* and the instantaneous rotation center Cf is denoted by θf, and an angle (smaller angle) formed by the ground horizontal surface and a line connecting between a ground contact point of the rear wheel 10*r* and the instantaneous rotation center Cr is denoted by θr, such a relationship that θr is larger than θf is satisfied (θf<θr). In the following, θf is referred to as instantaneous rotation angle θf, and θr is referred to as instantaneous rotation angle θr.

In this configuration (geometry) of the suspension 20, when a driving torque is applied to the front wheel 10*f*, as illustrated in FIG. 3, a force Ff1 forward in a travel direction of the vehicle acts at the ground contact point of the front wheel 10*f*, and a vertical force Fzf1 (a component force downward in the vertical direction acting on the front wheel suspension 20*f*) biasing the vehicle body B downward via the front wheel suspension 20*f* is generated by the force Ff1 at the ground contact point of the front wheel 10*f*. Thus, the force in the direction of sinking the vehicle body B acts as a result of the driving of the front wheel 10*f*. In contrast, when a braking torque is applied to the front wheel 10*f*, a force Ff2 backward in the travel direction of the vehicle acts at the ground contact point of the front wheel 10*f*, and a vertical force Fzf2 (a component force upward in the vertical direction acting on the front wheel suspension 20*f*) biasing the vehicle body B upward via the front wheel suspension 20*f* is generated by the force Ff2 at the ground contact point of the front wheel 10*f*. Thus, the force in the direction of raising the vehicle body B acts as a result of the braking of the front wheel 10*f*. Moreover, when a driving torque is applied to the rear wheel 10*r*, a force Fr1 forward in the travel direction of the vehicle acts at a ground contact point of the rear wheel 10*r*, and a vertical force Fzr1 (a component force upward in the vertical direction acting on the rear wheel suspension 20*r*) biasing the vehicle body B upward via the rear wheel suspension 20*r* is generated by the force Fr1 at the ground contact point of the rear wheel 10r. Thus, the force in the direction of raising the vehicle body B acts as a result of the driving of the rear wheel 10r. In contrast, when a braking torque is applied to the rear wheel 10r, a force Fr2 backward in the travel direction of the vehicle acts at the ground contact point of the rear wheel 10r, and a vertical force Fzr2 (a component force downward in the vertical direction acting on the rear wheel suspension 20r) biasing the vehicle body B downward via the rear wheel suspension 20r is generated by the force Fr2 at the ground contact point of the rear wheel 10r. Thus, the force in the direction of sinking the vehicle body B acts as a result of the braking of the rear wheel 10r. The suspension 20 converts the driving force and the braking force on the wheel 10 into the force in the vertical direction of the vehicle body B in this way.

The force in the vertical direction can be applied to the vehicle body B by controlling the driving force or the braking force on the wheel 10, resulting in control of the motion state of the vehicle. In the following, both the driving force and the braking force are generally referred to as driving force unless discrimination is particularly necessary. The braking force may be treated as a negative driving force. Moreover, when a magnitude of the driving force or the braking force is discussed, the magnitude represents an absolute value thereof.

The ECU 50 calculates a driver-requested braking/driving force (hereinafter referred to as driver-requested driving force F*) based on the accelerator operation amount and the brake operation amount detected by the operation state detection device 40, and calculates a motion control braking/driving force (hereinafter referred to as control driving force Fcx) independently for each of the four wheels based on the vehicle motion state detected by the motion state detection device 45. Then, the ECU 50 sets a sum of the control driving force Fcx and a driver-requested distributed driving force Fdx acquired by distributing the driver-requested driving force F* to the four wheels as a target braking/driving force (hereinafter referred to as target driving force Fx) for each of the wheels 10. The ECU 50 controls the motor driver 35 to generate an output torque corresponding to the target driving force Fx on each motor 30.

A magnitude of the vertical force acting on the vehicle body B is a value acquired by multiplying the driving force Ff (Ff1 or Ff2) by tan(θf) for the front wheel 10f side, and is a value acquired by multiplying the driving force Fr (Fr1 or Fr2) by tan(θr) for the rear wheel 10r side. These terms of tan(θf) and tan(θr) each represent a conversion rate for converting the driving force into the vertical force on the vehicle body B. A control range of the driving force on the front wheel 10f and a control range of the driving force on the rear wheel 10r are the same, but the instantaneous rotation angle θf of the front wheel suspension 20f is smaller than the instantaneous rotation angle θr of the rear wheel suspension 20r, and hence the range of the vertical force which can be generated by controlling the driving force on the front wheel 10f is narrower than the range of the vertical force which can be generated by controlling the driving force on the rear wheel 10r. As a result, when the motion control for the vehicle body is carried out by generating the vertical force, the driving force on the front wheel 10f tends to exceeds the control range (upper limit) first. In other words, while a reserve force remains in the driving force on the rear wheel 10r, the driving force on the front wheel 10f may exceed the control range (upper limit).

Figure 4:
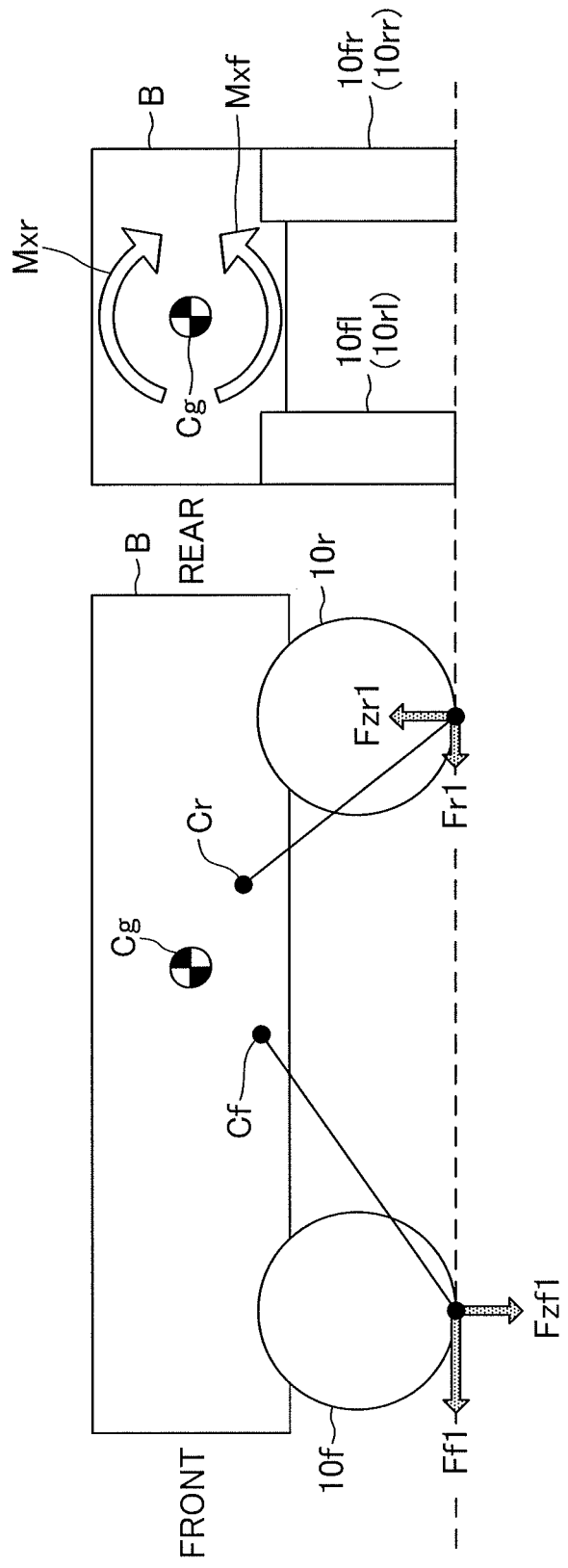
FIG. 4 is a diagram illustrating braking/driving forces on front and rear wheels required for balancing roll moments.
Figure 5:
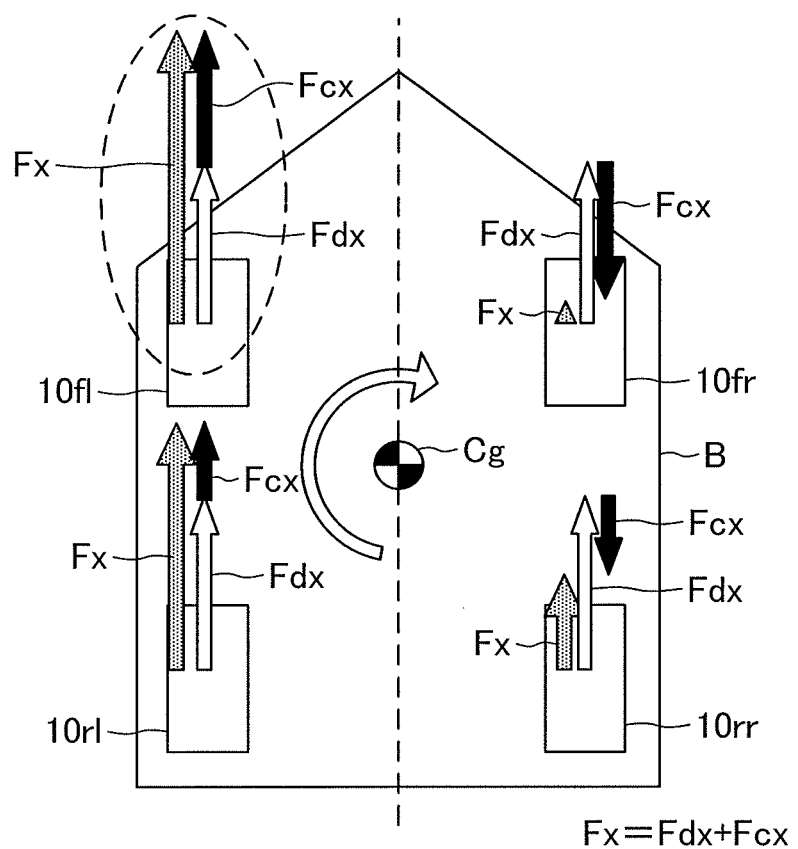
FIG. 5 is a diagram illustrating driver-requested distributed driving forces, control driving forces, and target driving forces on four wheels when a driver-requested driving force is equally distributed.

For example, as illustrated in FIG. 5, such a case that the motor 30 is driven to generate the yaw motion of the vehicle during the right turn is considered. When the yaw motion is generated, the control driving force Fcx in the forward direction is applied to a turning outer wheel, and the control driving force Fcx which is the same in magnitude and is opposite in direction with respect to the control driving force Fcx applied on the turning outer wheel is applied to a turning inner wheel. On this occasion, different vertical forces are generated on the vehicle body B on the right and left sides, and, as illustrated in FIG. 4, roll moments Mxf and Mxr thus act. The front wheel roll moment Mxf generated by the driving force Ff1 on the front wheel 10f is opposite in direction to the rear wheel roll moment Mxr generated by the driving force Fr1 on the rear wheel 10r. In this case, when the driving forces with the same magnitude are generated on the front wheel 10f and the rear wheel 10r, the magnitude of the vertical force (upward) generated by the driving force Fr1 on the rear wheel 10r is larger than the magnitude of the vertical force (downward) generated by the driving force Ff1 on the front wheel 10f. As a result, the rear wheel roll moment Mxr is larger than the front wheel roll moment Mxf. Thus, the front wheel roll moment Mxf and the rear wheel roll moment Mxr need to balance with each other, and, as illustrated in FIG. 4, the driving force Ff1 on the front wheel 10f needs to be larger than the driving force Fr1 on the rear wheel 10r. In other words, in order that the vertical force Fzf1 generated by the driving force Ff1 on the front wheel 10f and the vertical force Fzr1 generated by the driving force Fr1 on the rear wheel 10r have the same magnitude, the driving force Ff1 on the front wheel 10f needs to be larger than the driving force Fr1 on the rear wheel 10r.

The target driving force Fx of the motor 30 on each wheel 10 is set as a sum of the driver-requested distributed driving force Fdx and the control driving force Fcx for the vehicle motion control. Hitherto, the driver-requested distributed driving force Fdx has been set to a value (F*/4) acquired by equally distributing the driver-requested driving force F* set depending on the operation amount by the driver to the four wheels. Therefore, for example, when the roll control is carried out to balance (equalize) the front wheel roll moment Mxf and the rear wheel roll moment Mxr with each other as described above during the yaw motion of the vehicle, as illustrated in FIG. 5, the control driving force Fcx for the front wheel 10f is larger than the control driving force Fcx for the rear wheel. As a result, the target driving force Fx for the front wheel 10fl which is a turning outer front wheel first exceeds the control range (upper limit) of the motor 30.

Thus, in this embodiment, the distributions of the driving forces to the front and rear wheels are equalized, thereby controlling the target driving force Fx of each wheel to be hard to reach the upper limit of the control range of the motor 30.

Figure 2:
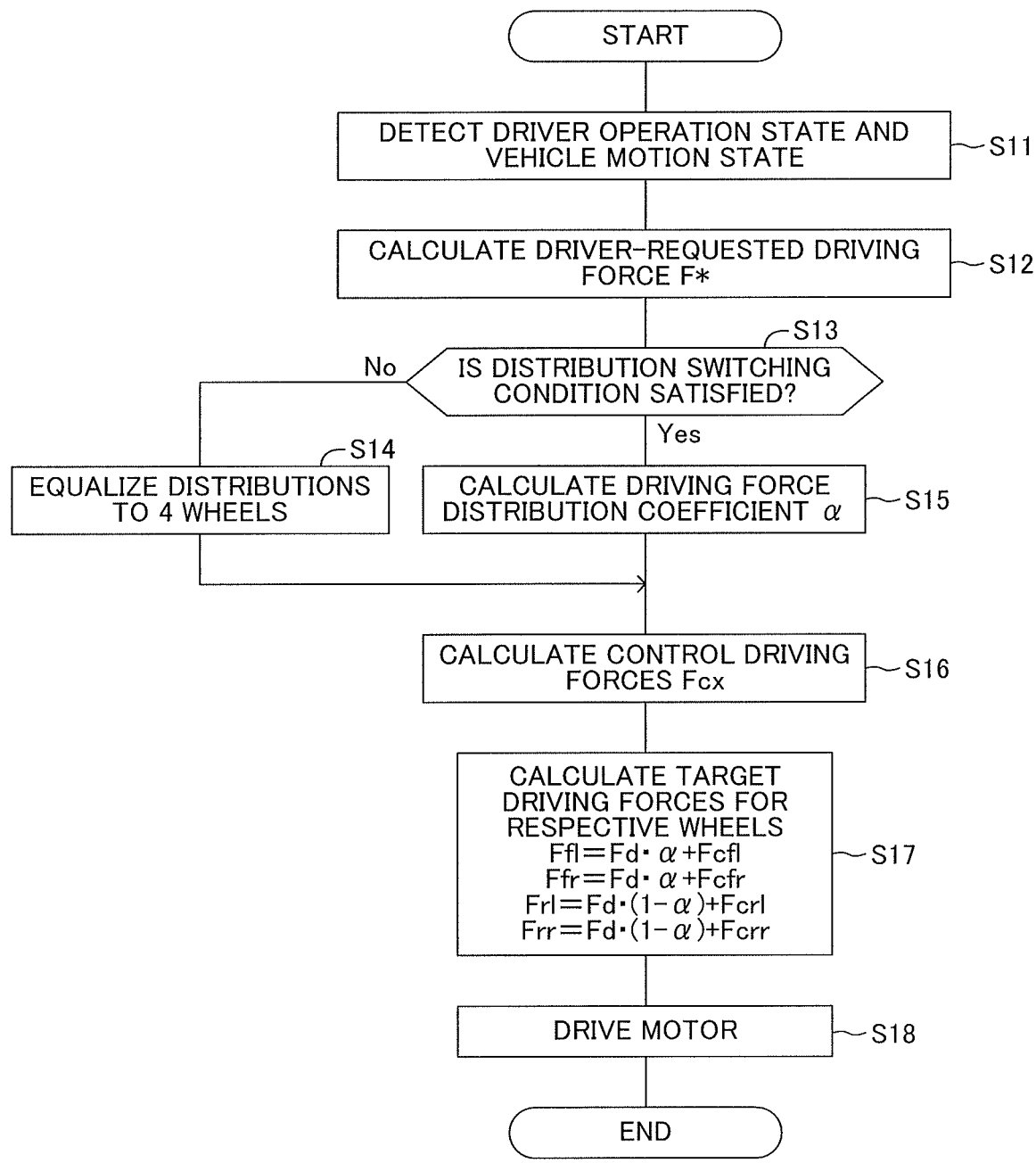
FIG. 2 is a flowchart illustrating a motor drive control routine.

FIG. 2 illustrates a motor drive control routine for solving the problem. The ECU 50 repeats the motor drive control routine at a predetermined short cycle. When this routine starts, in Step S11, the ECU 50 first detects the driver operation state and the vehicle motion state. In this case, the ECU 50 acquires the accelerator operation amount, the brake operation amount, and the steering operation amount acquired from the sensor values of the operation state detection device 40, and acquires motion state amounts representing degrees of the vehicle speed and motion states (the yaw motion, the roll motion, the pitch motion, and the heave motion) of the vehicle body acquired from the sensor values detected by the motion state detection device 45.

Then, in Step S12, the ECU 50 calculates the driver-requested driving force F* based on the accelerator operation amount and the brake operation amount. The driver-requested driving force F* is a driving force in a vehicle fore-and-aft direction requested by the driver to be generated on the entire vehicle, namely, a driving force for traveling. The ECU 50 stores association data such as a map for deriving the driver-requested driving force F* from the accelerator operation amount and the brake operation amount, and uses the association data to calculate the driver-requested driving force F*.

Then, in Step S13, the ECU 50 determines whether or not a switching condition for switching the distribution ratio of the driver-requested driving force F* to the front and rear wheels is satisfied. The driver-requested driving force F* is distributed to the four wheels. The driver-requested driving force F* is always equally distributed (1:1) between the right wheels 10fr and 10rr and the left wheels 10fl and 10rl, but the distribution between the front wheel 10f and the rear wheel 10r is switched depending on whether or not the switching condition is satisfied.

In this embodiment, the switching condition is satisfied when the vehicle motion control including the yaw motion control needs to be carried out, and is not satisfied when the yaw motion control does not need to be carried out. For example, the switching condition is satisfied when a difference between an ideal yaw rate set based on the steering angle and the vehicle speed and the actual yaw rate detected by the yaw rate sensor exceeds a permissible value, and the switching condition is not satisfied when the difference does not exceed the permissible value. Thus, in such a case that the steering operation is detected, or in such a case that a yaw motion due to disturbance is detected even though the steering operation is not carried out (the steering wheel is held at neutral), the switching condition is satisfied.

When the switching condition is not satisfied (No in Step S13), in Step S14, the ECU 50 sets the distribution ratio of the driver-requested driving force F* to be equal between the front and rear wheels. In other words, the driver-requested driving force F* is equally distributed to the four wheels 10. On the other hand, when the switching condition is satisfied (Yes in Step S13), in Step S15, the ECU 50 calculates a driving force distribution coefficient α for the front and rear wheels. On this occasion, the driving force distribution coefficient α represents a ratio of the driver-requested driving force F* distributed to the front wheel 10f. Thus, the ratio of distribution to the rear wheel 10r is represented as (1−α). The driving force distribution coefficient α calculated in Step S15 is set so that the distribution of the driver-requested driving force F* is larger for the rear wheel 10r than for the front wheel 10f.

A description is now given of the calculation of the driving force distribution coefficient α for the front and rear wheels. In this embodiment, the distribution ratio of the driver-requested driving force F* between the front and rear wheels is set so that the reserve force in the vertical direction which can be generated on the vehicle body B via the suspension 20 by the driving force on the wheels 10 is equal between the front wheel 10f side and the rear wheel 10r side.

1. Vertical Force

When the driving force on the front wheel 10f is denoted by Ff, and the driving force on the rear wheel 10r is denoted by Fr, the vertical force Fzf generated by the driving force Ff on the front wheel 10f and the vertical force Fzr generated by the driving force Fr on the rear wheel 10r are represented by the following equations.

$Fzf = Ff \cdot \tan\theta f = Ff \cdot \Theta f$ (defined as $\Theta f = \tan\theta f$)

$Fzr = Fr \cdot \tan\theta r = Fr \cdot \Theta r$ (defined as $\Theta r = \tan\theta r$)

2. Driving Forces on Front and Rear Wheels After Distribution

When the driver-requested driving force F* is represented as 2×Fd, and the driving force distribution coefficient for the front wheel 10f is represented as α (0≤α≤1), the driving force distribution ratio for the rear wheel 10r is represented as (1−α). The driving force Ff for the front wheel 10f and the driving force Fr for the rear wheel 10r can be represented by using the driving force distribution coefficient α by the following equations.

$Ff = \alpha \cdot 2 \cdot Fd = 2\alpha \cdot Fd$ $Fr = (1-\alpha) \cdot 2 \cdot Fd = 2(1-\alpha) \cdot Fd$ When α is 0, 100% of the driver-requested driving force F* is distributed to the rear wheel 10r, and when α is 1, 100% of the driver-requested driving force F* is distributed to the front wheel 10f.

3. Vertical Force After Distribution

The vertical force Fzf generated by the driving force Ff on the front wheel 10f and the vertical force Fzr generated by the driving force Fr on the rear wheel 10r after the distribution of the driver-requested driving force F* to the front and rear wheels are represented by the following equations.

$Fzf = Ff \cdot \Theta f = 2\alpha \cdot Fd \cdot \Theta f$ $Fzr = Fr \cdot \Theta f = 2(1-\alpha) \cdot Fd \cdot \Theta f$ 4. Maximum Vertical Force When the maximum driving force that can be generated by each of the front wheel 10f and the rear wheel 10r is Fmax, the maximum vertical force Fzfmax that can be generated by the driving force Ff on the front wheel 10f and the maximum vertical force Fzrmax that can be generated by the driving force Fr on the rear wheel 10r can be represented by the following equations.

$Fzf\max = F\max \cdot \Theta f$ $Fzr\max = F\max \cdot \Theta r$

5. Reserve Vertical Force

When the reserve vertical force which can be generated by the driving force Ff on the front wheel 10f is Fzfc (referred to as front wheel reserve vertical force Fzfc), and the reserve vertical force which can be generated by the driving force Ff on the rear wheel 10r is Fzrc (referred to as rear wheel reserve vertical force Fzrc), the front wheel reserve vertical force Fzfc and the rear wheel reserve vertical force Fzrc can be represented by the following equations.

$$\begin{aligned} Fzfc &= Fzf\max - Fzf \\ &= F\max \cdot \Theta f - 2\alpha \cdot Fd \cdot \Theta f \\ &= (F\max - 2\alpha \cdot Fd) \cdot \Theta f \end{aligned}$$

$$\begin{aligned} Fzrc &= Fzr\max - Fzr \\ &= F\max \cdot \Theta r - 2(1-\alpha) \cdot Fd \cdot \Theta r \\ &= (F\max - 2(1-\alpha) \cdot Fd) \cdot \Theta r \end{aligned}$$

6. Equalization of Reserve Vertical Forces

When the front wheel reserve vertical force Fzfc and the rear wheel reserve vertical force Fzrc are equalized, the driver-requested driving force can be distributed in a well-balanced form, and only a certain wheel is prevented from reaching the driving limit earlier. In this case, the driving force distribution coefficient α can be set as follows.

$Fzfc = Fzrc$ $(F\max - 2\alpha \cdot Fd) \cdot \Theta f = (F\max - 2(1-\alpha) \cdot Fd) \cdot \Theta r$ $(1 - 2\alpha \cdot Fd/F\max) = (1 - 2(1-\alpha) \cdot Fd/F\max) \cdot \Theta r/\Theta f$ On this occasion, when Fd/Fmax is set to A, and $\Theta r/\Theta f$ is set to D, the above-mentioned equation can be represented by the following equation.

$$(1-2\alpha \cdot A)=(1-2(1-\alpha)\cdot A)\cdot D$$

Symbol A is referred to as maximum output ratio ($0 \leq A \leq 1$), and symbol D is referred to as front/rear vertical conversion ratio (D>1).

The maximum output ratio A has a value proportional to the driver-requested driving force. In this case, an accelerator opening degree may be used as the maximum output ratio A.

When the equation is solved in terms of the driving force distribution coefficient $\alpha$, the equation can be represented as follows.

$$1-2\alpha \cdot A = D - 2A \cdot D + 2\alpha \cdot A \cdot D$$

$$2\alpha \cdot A(1+D) = 1 - D + 2A \cdot D$$

$$\alpha = (1-D+2A \cdot D)/2A(1+D))$$

7. Consideration of Driving Force Distribution Coefficient $\alpha$

Case of A=0

The driving force distribution coefficient $\alpha$ can be represented by the following equation.

$$\alpha = ((1-D)/A + 2D)/2(1+D))$$

The front/rear vertical force conversion ratio D is a value larger than 1, and (1−D) is thus a negative value. Therefore, the driving force distribution coefficient $\alpha$ is a negative infinite value ($\alpha = -\infty$).

A possible range which the driving force distribution coefficient $\alpha$ can take is 0 to 1 ($0 \leq \alpha \leq 1$), and the driving force distribution coefficient $\alpha$ should be zero ($\alpha = 0$).

Case of A=1

When a value A=1 is substituted into the above equation, the driving force distribution coefficient $\alpha$ is 0.5 ($\alpha = 0.5$).

On this occasion, the maximum output ratio A satisfying $\alpha = 0$ is to be acquired.

$$0 = 1 - D + 2A \cdot D$$

$$A = (D-1)/(2D)$$

Figure 7:
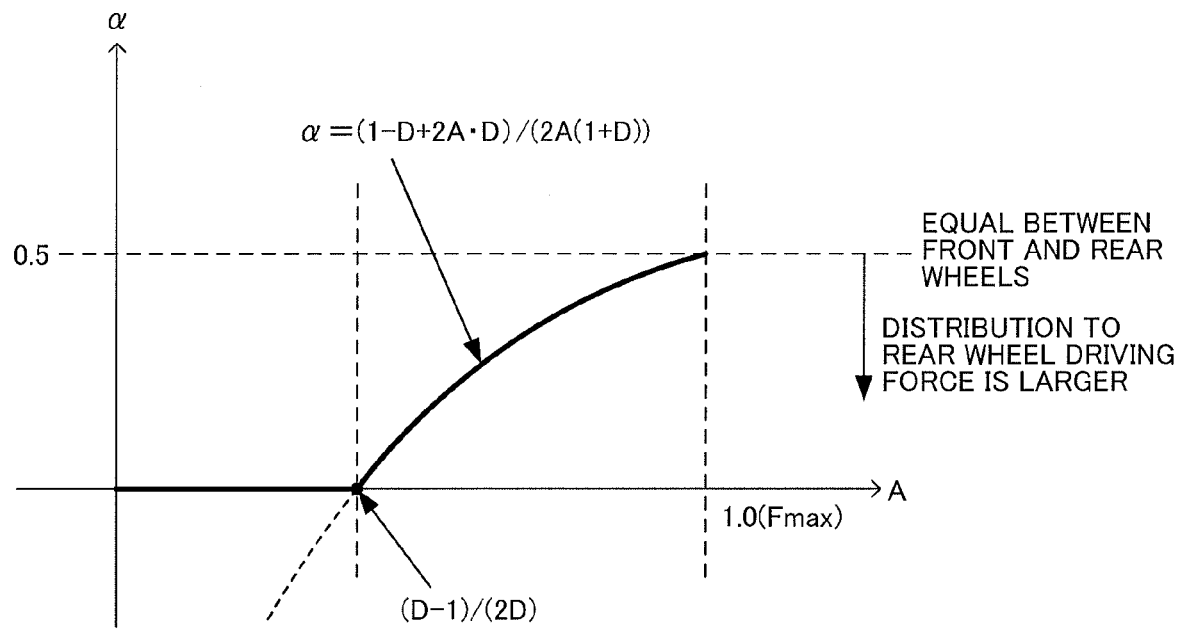
FIG. 7 is a characteristic graph of a driving force distribution coefficient $\alpha$.

Thus, as shown in FIG. 7, the driving force distribution coefficient a is set to zero when the maximum output ratio A is less than (D−1)/(2D), and is set to (1−D+2A·D)/(2A(1+D)) when the maximum output ratio A is equal to or more than (D−1)/(2D).

Thus, in Step S15, the ECU 50 sets the driving force distribution coefficient $\alpha$ to zero when the maximum output ratio A, which is determined based on the driver-requested driving force F* (or the accelerator operation amount), is less than (D−1)/(2D), and is set to (1−D+2A·D)/(2A(1+D)) when the maximum output ratio A is equal to or more than (D−1)/(2D).

After, in Step S14 or S15, the ECU 50 sets the driving force distribution coefficient $\alpha$, the ECU 50 proceeds to processing in Step S16. In Step S16, the ECU 50 calculates the control driving force Fcx for each wheel 10, namely, the control driving force Fcfl for the front left wheel 10fl, the control driving force Fcfr for the front right wheel 10fr, the control driving force Fcrl for the rear left wheel 10rl, and the control driving force Fcrr for the rear right wheel 10rr. The control driving force Fcx is used to generally refer to the control driving forces Fcfl, Fcfr, Fcrl, and Fcrr. The vehicle motion control is carried out in such a case that the difference between the ideal yaw rate and the actual yaw rate detected by the yaw rate sensor exceeds the permissible value, or such a case that at least one of the roll state amount, the pitch state amount, and the heave state amount exceeds the permissible value. Thus, when the vehicle motion control does not need to be carried out, the processing in Step S16 is skipped.

For example, the control driving force Fcx for each wheel 10 is calculated by using a target roll moment Mx for suppressing a roll motion of the vehicle body about a fore-and-aft axis (roll axis) passing through the center of gravity Cg of the vehicle, a target pitch moment My for suppressing a pitch motion of the vehicle body about a lateral axis (pitch axis) passing through the center of gravity Cg of the vehicle, a target yaw moment Mz for turning the vehicle body about a vertical axis (yaw axis) passing through the center of gravity Cg of the vehicle, and a target heave force Fz for suppressing a heave motion (bouncing) which is a vertical motion at the position of the center of gravity Cg of the vehicle. Various publicly known calculation means may be employed to calculate these target values. For example, the ECU 50 uses the sensor values detected by the stroke sensors and the sprung mass vertical acceleration sensors to detect the positions, the speeds, and the accelerations in the vertical direction at the four wheels, thereby detecting the roll state amount, the pitch state amount, and the heave state amount, and calculates the target roll moment Mx, the target pitch moment My, and the target heave force Fz which have predetermined relationships with these state amounts. Moreover, the ECU 50 calculates, based on the difference between the ideal yaw rate set based on the steering angle and the vehicle speed and the actual yaw rate detected by the yaw rate sensor, the target yaw moment Mz set so as to eliminate the difference.

The ECU 50 calculates the control driving forces Fcfl, Fcfr, Fcrl, and Fcrr, for example, by using the following equation.

$$\begin{bmatrix} Fc_{fl} \\ Fc_{fr} \\ Fc_{rl} \\ Fc_{rr} \end{bmatrix} = \begin{bmatrix} -\frac{t_f}{2}\cdot\tan\theta_f & \frac{t_f}{2}\cdot\tan\theta_f & \frac{t_r}{2}\cdot\tan\theta_r & -\frac{t_r}{2}\cdot\tan\theta_r \\ L_f\cdot\tan\theta_f & L_f\cdot\tan\theta_f & L_r\cdot\tan\theta_r & L_r\cdot\tan\theta_r \\ -\frac{t_f}{2} & \frac{t_f}{2} & -\frac{t_r}{2} & \frac{t_r}{2} \\ -\tan\theta_f & -\tan\theta_f & \tan\theta_r & \tan\theta_r \end{bmatrix}^{-1} \cdot \begin{bmatrix} M_x \\ M_y \\ M_z \\ F_z \end{bmatrix} \quad (1)$$

On this occasion, symbol tf represents a tread width between the front left and right wheels 10f, and symbol tr represents a tread width between the rear left and right wheels 10r. Symbol Lf represents a fore-and-aft horizontal distance between the center of gravity Cg of the vehicle and a center of the front left or right wheel 10f, and symbol Lr represents a fore-and-aft horizontal distance between the center of gravity Cg of the vehicle and a center of the rear left or right wheel 10r.

In this case, the ECU 50 selects three out of the target roll moment Mx, the target pitch moment My, the target yaw moment Mz, and the target heave force Fz to calculate the control driving forces Fcfl, Fcfr, Fcrl, and Fcrr. This is because the driving forces to be finally generated on the respective wheels 10 are determined by the driver-requested driving force F*, in other words, such a restraint that a sum of the control driving forces Fcfl, Fcfr, Fcrl, and Fcrr is set to zero exists, and hence the four target values cannot be used at the same time for the calculation. In this case, if the yaw motion control is necessary, the ECU 50 selects the target yaw moment Mz and the target roll moment Mx by priority, and uses these two target values Mz and Mx and any one of the remaining target pitch moment My and target heave force Fz for the calculation.

Figure 8:
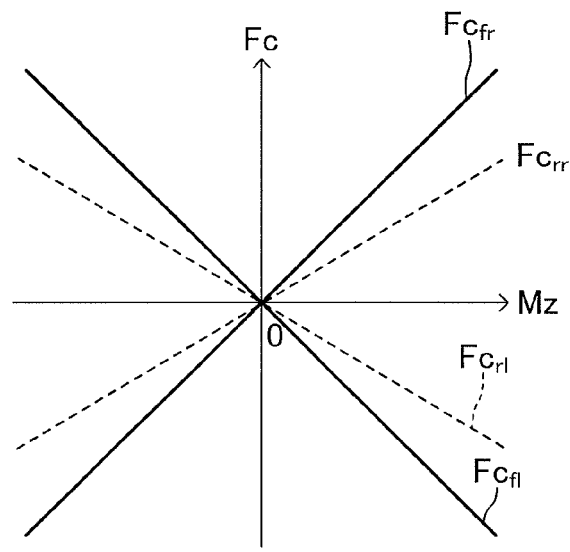
FIG. 8 is a characteristic graph of the control driving forces during yaw motion.

When the yaw motion is controlled, as described above, the front wheel roll moment Mxf and the rear wheel roll moment Mxr opposite to each other in direction, and different in magnitude from each other are generated, and such roll control that the front wheel roll moment Mxf and the rear wheel roll moment Mxr are balanced with each other is carried out. In this case, the conversion rate (tan(θf)) for converting the driving force on the front wheel 10*f* into the vertical force is smaller than the conversion rate (tan(θr)) for converting the driving force on the rear wheel 10*r* into the vertical force, and hence, when the roll control is carried out simultaneously with the yaw motion control, as shown in FIG. 8, the calculation is carried out so that the control driving forces Fcfl and Fcfr for the front wheel 10*f* are larger than the control driving forces Fcrl and Fcrr for the rear wheel 10*r* (comparison in absolute value).

Then, in Step S17, the ECU 50 calculates a final target driving force Fx for each wheel 10, namely, a target driving force Ffl for the front left wheel 10*fl*, a target driving force Ffr for the front right wheel 10*fr*, a target driving force Frl for the rear left wheel 10*rl*, and a target driving force Frr for the rear right wheel 10*rr* by the following equations.

$$Ffl = Fd \cdot \alpha + Fcfl$$

$$Ffr = Fd \cdot \alpha + Fcfr$$

$$Frl = Fd \cdot (1-\alpha) + Fcrl$$

$$Frr = Fd \cdot (1-\alpha) + Fcrr$$

Note that, the target driving force Fx is used to generally refer to the target driving forces Ffl, Ffr, Frl, and Frr.

Then, in Step S18, the ECU 50 converts the target driving force Fx into a target motor torque Tx for driving the motor 30, and outputs a drive command signal corresponding to the target motor torque Tx to the motor driver 35. When the target motor torque Tx represents a driving torque, a current flows from the motor driver 35 to the motor 30. When the target motor torque Tx represents a braking torque, a current flows from the motor 30 via the motor driver 35 to the battery 60. The power running control or the regeneration control is applied to the motors 30 in this way, resulting in generation of the target driving force Fx on each wheel 10.

The ECU 50 outputs the drive command signal to the motor driver 35, and then once finishes the motor drive control routine. Then, the ECU 50 repeats the motor drive control routine at the predetermined short cycle.

Figure 6:
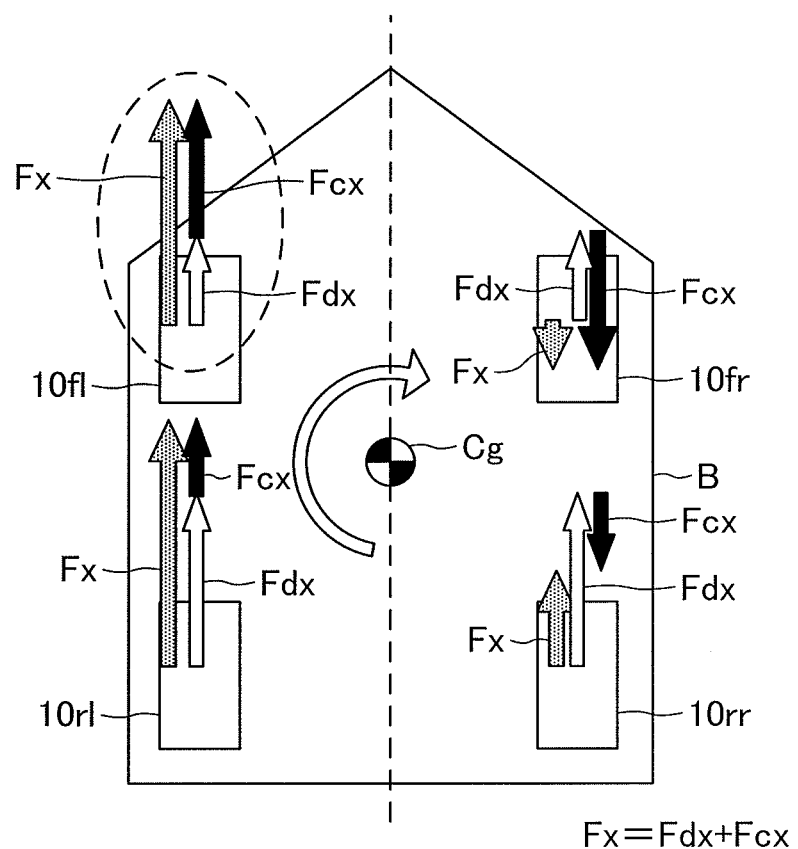
FIG. 6 is a diagram illustrating the driver-requested distributed driving forces, the control driving forces, and the target driving forces on the four wheels when the driver-requested driving force is distributed more to the rear wheels.

When the yaw motion is controlled by the driving force of the motor 30, the motor driving control routine distributes the driver-requested driving force F* more to the rear wheel 10*r* than to the front wheel 10*f*. Therefore, even when such roll control that the roll moment generated on the front wheel 10*f* side and the roll moment generated on the rear wheel 10*r* side are balanced with each other is carried out, as illustrated in FIG. 6, the target driving force Fx (=Ffl) on the front wheel 10*fl*, which is the turning outer front wheel, can be suppressed. In other words, the driver-requested distributed driving force Fdx (=Fd·α) on the front wheel 10*fl* is smaller than the driver-requested distributed driving force Fdx (=Fd·(1−α)) on the rear wheel 10*rl*, and hence a large margin of applying the control driving force Fcx on the front wheel 10*f* side can be secured, and even when the roll control is carried out simultaneously with the roll motion control, the target driving force Fx on the front wheel 10*fl* becomes hard to reach the output limit. Thus, the roll control carried out during the yaw motion control can be satisfactorily carried out.

Moreover, when the yaw motion control is not carried out, the distributions of the driver-requested driving force F* to the front left, front right, rear left, and rear right wheels are equally set. As a result, the tire generation forces can be equalized, resulting in an increase in vehicle stability.

Moreover, the distribution ratio of the driver-requested driving force F* between the front and rear wheels is set so that the reserve vertical force which can be generated on the vehicle body B by the driving force on the wheel 10 is equal between the front wheel 10*f* side and the rear wheel 10*r* side. Therefore, the distribution of the driving force to the front and rear wheels can be carried out in a more balanced manner. As a result, the driving force on a certain wheel 10 is more satisfactorily prevented from reaching the limit earlier. Moreover, when the driver-requested driving force F* is less than a predetermined set value, the driver-requested driving force F* is distributed only to the rear wheel 10*r*. As a result, the driver-requested driving force can be appropriately distributed to the front and rear wheels when the driver-requested driving force is small.

The vehicle braking/driving force control apparatus according to this embodiment is described above, but the present invention is not limited to the above-mentioned embodiment. Various modifications may be made thereto without departing from the gist of the present invention.

<Modified Example of Distribution Switching Condition>

For example, in this embodiment, the driver-requested driving force F* is switched from the front/rear wheel equal distribution to the rear wheel-biased distribution when the vehicle motion control including the yaw motion control is carried out (S13). This is because the distributions of the control driving force for the yaw motion control can be set to different values for the front and rear wheels, and the switching is thus particularly effective. However, the present invention is not limited to this case, and the driver-requested driving force F* may be switched from the front/rear wheel equal distribution to the rear wheel-biased distribution if the vehicle motion control not limited to the yaw motion control is carried out. For example, in Step S13, when at least one motion state amount out of a roll motion amount (such as the roll moment), a vertical motion amount (such as the vertical force), and a pitch motion amount (such as the pitch moment) of the vehicle may be detected, and when the detected motion state amount exceeds a set value (permissible value), the distribution ratio of the driver-requested driving force F* to the front and rear wheels may be switched. Even in this case, while the front wheel motor 30*f* is prevented from reaching the output limit earlier, a large vertical force may be generated on the front wheel 10*f* side.

Moreover, in this embodiment, when the distribution switching condition is satisfied, the distribution of the driver-requested driving force F* is switched from the front/rear wheel equal distribution to the rear wheel-biased distribution, but, for example, such a configuration that the switching condition may not be provided, and the distribution ratio of the driver-requested driving force F* to the rear wheel 10*r* is always larger than that to the front wheel 10*f* may be provided.

<Modified Example of Distribution Ratio>

In this embodiment, the distribution ratio of the driver-requested driving force F* between the front and rear wheels is set so that the reserve vertical force which can be generated on the vehicle body B by the driving force on the wheel 10 is equal between the front wheel 10*f* side and the rear wheel 10*r* side (S15). However, the present invention is not limited to this case, and, for example, when the switching condition is satisfied, in Step S15, the distribution ratio of the driver-requested driving force F* to the rear wheel may be switched to a certain ratio larger than that to the front wheel.

Moreover, such a configuration that the yaw moment generated on the vehicle is detected, and the distribution ratio of the driver-requested driving force F* to the front and rear wheels is set based on this yaw moment may be provided. For example, in Step S11, the yaw motion amount (such as the yaw moment) of the vehicle may be detected, and, in Step S15, the distribution ratio of the driver-requested driving force F* to the front and rear wheels may be set depending on the magnitude of the detected yaw motion amount. In this case, as the detected yaw motion amount increases, the distribution ratio to the rear wheel 10r may be set to increase stepwise or continuously. As a result, as the yaw motion amount increases, the reserve vertical force on the front wheel 10f increases, resulting in appropriate roll control caused by the yaw motion.

Moreover, the distribution ratio of the driver-requested driving force F* to the front and rear wheels may be set depending on the magnitude of the motion state amount not limited to the yaw motion amount. For example, at least one motion state amount out of the roll motion amount (such as the roll moment), the vertical motion amount (such as the vertical force), and the pitch motion amount (such as the pitch moment) of the vehicle may be detected, and, in Step S15, the distribution ratio of the driver-requested driving force F* to the front and rear wheels may be set depending on the magnitude of this motion state amount. In this case, as the motion state amount increases, the distribution ratio of the driver-requested driving force F* to the rear wheel 10r may be set to increase stepwise or continuously. As a result, as the motion state amount increases, the reserve vertical force on the front wheel 10f increases, resulting in appropriate vehicle motion control.

Moreover, in this embodiment, if the distribution switching condition is not satisfied, the distributions of the driver-requested driving force F* to the front left and right and rear left and right wheels are equalized (S14), but the distributions may not be always equal. In other words, when the vehicle motion control is carried out (Yes in Step S13), the distributions of the driver-requested driving force F* to the front and rear wheels may be switched so that the distribution ratio of the driver-requested driving force F* to the rear wheel 10r is more than that in the case where the vehicle motion control is not carried out (No in Step S13). Of course, the distribution ratio of the driver-requested driving force F* to the front and rear wheels is set in Step S15 so that the distribution to the rear wheel 10r is more than the distribution to the front wheel 10f.

<Modified Example of Suspension Geometry>

For example, this embodiment is applied to such a vehicle that the conversion rate (tan(θr)) on the rear wheel suspension 20r is more than the conversion rate (tan(θf)) on the front wheel suspension 20f, but this embodiment may be applied to such a vehicle that the conversion rate (tan(θf)) of the front wheel suspension 20f is more than the conversion rate (tan(θr)) of the rear wheel suspension 20r. In this case, the distributions of the driver-requested driving force F* to the front and rear wheels may be set so that the distribution is more to the front wheel 10f than to the rear wheel 10r. Thus, the relationship between the distributions of the driver-requested driving force F* to the front and rear wheels may be reversed from that in the embodiment also in the various modified examples described above.

What is claimed is:

1. A vehicle braking/driving force control apparatus, comprising:
    an actuator for independently driving a front left wheel, a front right wheel, a rear left wheel, and a rear right wheel, thereby generating a braking/driving force representing both a braking force and a driving force on each of the front left wheel, the front right wheel, the rear left wheel, and the rear right wheel;
    a suspension link mechanism for independently coupling the each of the front left wheel, the front right wheel, the rear left wheel, and the rear right wheel to a vehicle body, and converting the braking/driving force on the each of the front left wheel, the front right wheel, the rear left wheel, and the rear right wheel driven by the actuator into a force in a vertical direction of the vehicle body,
        the suspension link mechanism being configured so that a conversion rate of converting the braking/driving force into the force in the vertical direction of the vehicle body is different between a front wheel side and a rear wheel side;
    target braking/driving force calculation means for calculating target braking/driving forces for the four wheels, including a driver-requested braking/driving force set based on an operation amount of a driver and a motion control braking/driving force necessary for vehicle motion control;
    actuator control means for controlling operations of the actuators by following the target braking/driving forces; and
    distribution setting means for setting a distribution of the driver-requested braking/driving force to the front wheels and the rear wheels so that the distributed driver-requested braking/driving force is larger for the wheels coupled to the suspension link mechanisms having a larger conversion rate than for the wheels coupled to the suspension link mechanisms having a smaller conversion rate, wherein the actuator control means includes the conversion rate pre-stored therein.

2. A vehicle braking/driving force control apparatus according to claim 1, further comprising distribution switching means for switching the distribution of the driver-requested braking/driving force to the front wheels and the rear wheels so that a distribution ratio of the driver-requested braking/driving force to the wheels coupled to the suspension link mechanisms having the larger conversion rate becomes larger when the vehicle motion control is carried out than when the vehicle motion control is not carried out,
    wherein when at least the vehicle motion control is carried out, the distribution setting means sets the distribution of the driver-requested braking/driving force to the front wheels and the rear wheels so that the distributed driver-requested braking/driving force is larger for the wheels coupled to the suspension link mechanisms having the larger conversion rate than for the wheels coupled to the suspension link mechanisms having the smaller conversion rate.

3. A vehicle braking/driving force control apparatus according to claim 2, further comprising non-motion-control-time distribution setting means for setting, when the vehicle motion control is not carried out, the distributions of the driver-requested braking/driving force to the front left wheel, the front right wheel, the rear left wheel, and the rear right wheel to be equal to one another.

4. A vehicle braking/driving force control apparatus according to claim 2,
    wherein the distribution switching means switches the distribution of the driver-requested braking/driving force to the front wheels and the rear wheels so that the distribution ratio of the driver-requested braking/driving force to the wheels coupled to the suspension link mechanisms having the larger conversion rate becomes larger when vehicle yaw motion control is carried out than when the vehicle yaw motion control is not carried out, and wherein when at least the vehicle yaw motion control is carried out, the distribution setting means sets the distribution of the driver-requested braking/driving force to the front wheels and the rear wheels so that the distributed driver-requested braking/driving force is larger for the wheels coupled to the suspension link mechanisms having the larger conversion rate than for the wheels coupled to the suspension link mechanisms having the smaller conversion rate.

5. A vehicle braking/driving force control apparatus according to claim 1, wherein when vehicle yaw motion control is carried out, the target braking/driving force calculation means calculates the motion control braking/driving force for the each of the front left wheel, the front right wheel, the rear left wheel, and the rear right wheel so that a front wheel roll moment generated by the driving forces of the front wheels and a rear wheel roll moment generated by the driving forces of the rear wheels are balanced with each other during the vehicle yaw motion control.

6. A vehicle braking/driving force control apparatus according to claim 1, further comprising reserve force equalization means for setting a distribution ratio of the driver-requested braking/driving force between the front wheels and the rear wheels so that reserve vertical forces, which are able to be generated via the suspension link mechanisms on the vehicle body by the braking/driving forces on the front left wheel, the front right wheel, the rear left wheel, and the rear right wheel, are equal between the front wheel side and the rear wheel side.

7. A vehicle braking/driving force control apparatus according to claim 6, further comprising small-requested-braking/driving-force distribution ratio setting means for setting, when the driver-requested braking/driving force is less than a set value set in advance, the distribution ratio between the front wheels and the rear wheels so that the driver-requested braking/driving force is distributed only to the wheels coupled to the suspension link mechanisms having the larger conversion rate.

8. A vehicle braking/driving force control apparatus according to claim 1, further comprising state-amount-adapted distribution ratio setting means for detecting a motion state amount of a vehicle, and setting a distribution ratio of the driver-requested braking/driving force between the front wheels and the rear wheels depending on the motion state amount.

9. A vehicle braking/driving force control apparatus according to claim 8, wherein the state-amount-adapted distribution ratio setting means sets the distribution ratio of the driver-requested braking/driving force to the rear wheel side so as to increase as the motion state amount increases.

* * * * *